United States Patent
Sawada et al.

(10) Patent No.: US 11,225,904 B2
(45) Date of Patent: Jan. 18, 2022

(54) INTERNAL-COMBUSTION ENGINE AND DRIVE SYSTEM

(71) Applicants: Fukuei Sawada, Tokorozawa (JP); Shigeru Sato, Saitama (JP)

(72) Inventors: Fukuei Sawada, Tokorozawa (JP); Shigeru Sato, Saitama (JP)

(73) Assignees: Fukuei Sawada, Tokorozawa (JP); Shigeru Sato, Hiki-Gun (JP)

( * ) Notice: Subject to any disclaimer, the term of this patent is extended or adjusted under 35 U.S.C. 154(b) by 0 days.

(21) Appl. No.: 16/608,712

(22) PCT Filed: Apr. 27, 2018

(86) PCT No.: PCT/JP2018/017279
§ 371 (c)(1),
(2) Date: Oct. 25, 2019

(87) PCT Pub. No.: WO2018/199313
PCT Pub. Date: Nov. 1, 2018

(65) Prior Publication Data
US 2021/0054780 A1    Feb. 25, 2021

(30) Foreign Application Priority Data
Apr. 28, 2017 (JP) .............................. JP2017-090654

(51) Int. Cl.
*F02B 75/02*   (2006.01)
*F02M 26/04*   (2016.01)
(Continued)

(52) U.S. Cl.
CPC .............. *F02B 75/021* (2013.01); *B60K 6/24* (2013.01); *B60K 6/26* (2013.01); *F01L 1/04* (2013.01);
(Continued)

(58) Field of Classification Search
CPC ............ F02B 75/021; F02B 2075/027; F02M 26/04; F02M 26/22; F01L 13/00;
(Continued)

(56) References Cited

U.S. PATENT DOCUMENTS 2,249,997 A * 7/1941 Wydler ................. F02B 75/021
123/1 R
5,746,166 A * 5/1998 Valasopoulos ............ F01L 1/08
123/90.17

(Continued)

FOREIGN PATENT DOCUMENTS

DE   112014006469 T5   12/2016
EP       2808516 A1    12/2014
(Continued)

OTHER PUBLICATIONS

A Decision of Refusal issued by the Japanese Patent Office, dated Feb. 6, 2018, for Japanese counterpart application No. 2017-090654. (3 pages).
(Continued)

*Primary Examiner* — Jacob M Amick
*Assistant Examiner* — Charles J Brauch
(74) *Attorney, Agent, or Firm* — Law Office of Katsuhiro Arai

(57) ABSTRACT

In an exemplary embodiment, an internal combustion engine, in which a valve is opened and closed when a piston reciprocates in a cylinder, has a configuration to perform repeatedly the following combined strokes: an intake stroke→a compression stroke→a combustion stroke→an exhaust stroke in a four-cycle internal combustion engine are combined with an intake and compression stroke→a combustion and exhaust stroke in a two-cycle internal combustion engine. The internal combustion engine can reduce pumping loss in a six-cycle internal combustion engine and increase the output.

15 Claims, 13 Drawing Sheets

(51) Int. Cl.
  *F02M 26/22* (2016.01)
  *B60K 6/24* (2007.10)
  *B60K 6/26* (2007.10)
  *F01L 1/04* (2006.01)
  *F01L 13/00* (2006.01)

(52) U.S. Cl.
  CPC .............. *F01L 13/00* (2013.01); *F02M 26/04* (2016.02); *F02M 26/22* (2016.02); *B60Y 2200/92* (2013.01); *B60Y 2300/437* (2013.01); *B60Y 2400/435* (2013.01); *B60Y 2400/60* (2013.01); *F02B 2075/027* (2013.01)

(58) Field of Classification Search
  CPC .... F01L 1/04; B60K 6/26; B60K 6/24; B60Y 2300/437; B60Y 2200/92; B60Y 2400/60; B60Y 2400/435
  See application file for complete search history.

(56) References Cited

U.S. PATENT DOCUMENTS

| | | | |
|---|---|---|---|
| 8,978,603 | B2 | 3/2015 | Williams et al. |
| 2009/0048756 | A1* | 2/2009 | Park .................. F02D 41/3058 701/101 |
| 2010/0095913 | A1 | 4/2010 | Kelem et al. |
| 2014/0137844 | A1* | 5/2014 | Yoshioka .............. F02D 41/107 123/568.19 |
| 2014/0366819 | A1 | 12/2014 | Tsukahara |
| 2015/0122231 | A1* | 5/2015 | Tuxen ................... F02M 25/06 123/527 |

FOREIGN PATENT DOCUMENTS

| | | |
|---|---|---|
| JP | H02119635 A | 5/1990 |
| JP | H08506879 A | 7/1996 |
| JP | 200825574 A | 2/2008 |
| JP | 2010031705 A | 2/2010 |
| JP | 2010537102 A | 12/2010 |
| JP | 2014169632 A | 9/2014 |
| JP | 201665506 A | 4/2016 |
| WO | 2015140868 A1 | 9/2015 |

OTHER PUBLICATIONS

A Notice of Reasons for Refusal issued by the Japanese Patent Office, dated Nov. 14, 2017, for Japanese counterpart application No. 2017-090654. (2 pages).

International Search Report (ISR) dated Jul. 17, 2018, issued for International application No. PCT/JP2018/017279. (2 pages).

Extended European Search Report (EESR) dated Jan. 13, 2021, issued for European counterpart patent application No. EP18790609.4 (3 pages).

* cited by examiner

Fig. 3
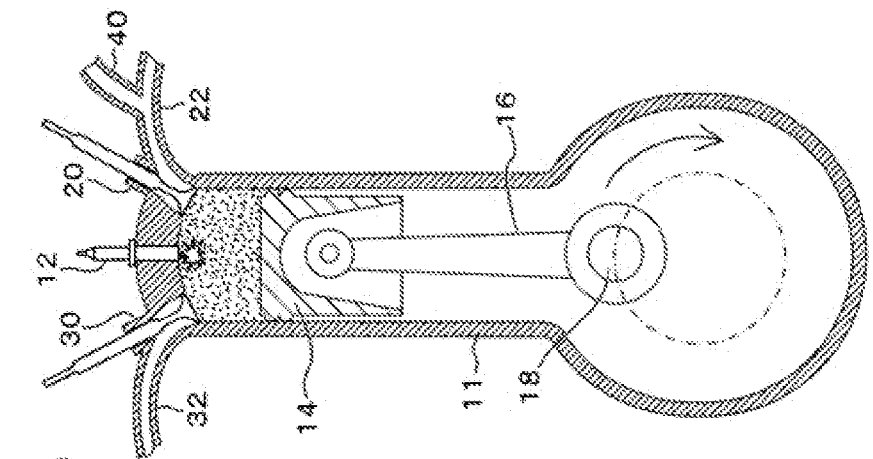
(G) Second-stage compression
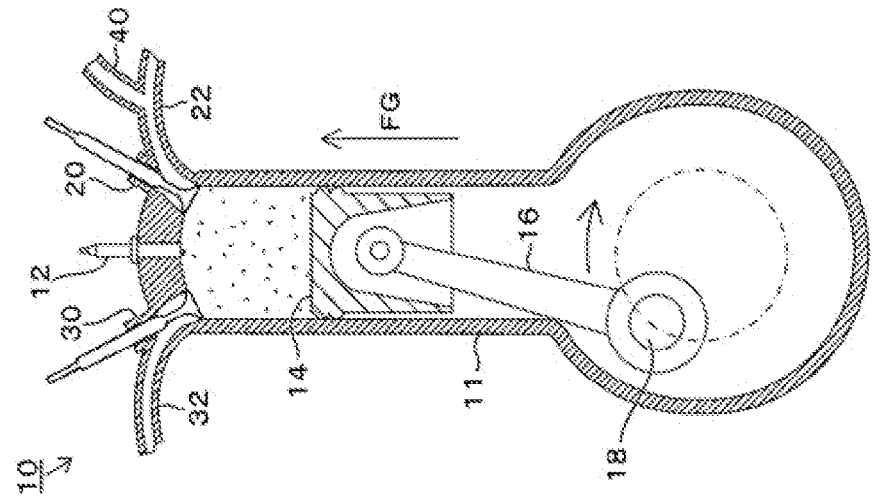
(H) Second-stage ignition Fig.9
(A)
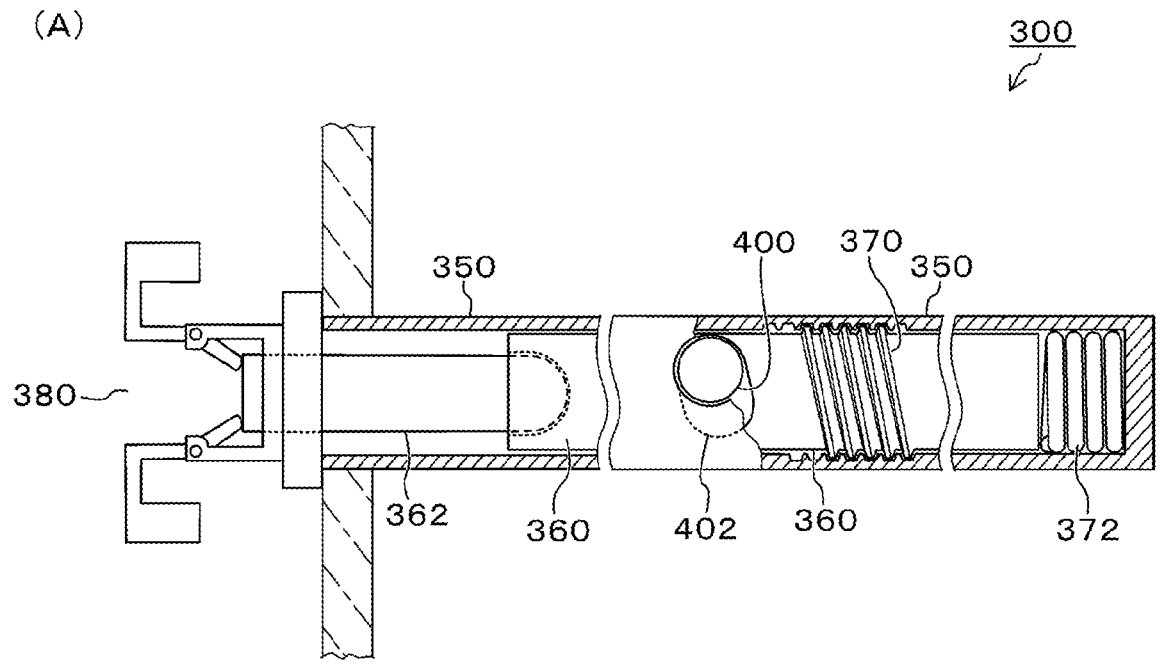
(B)
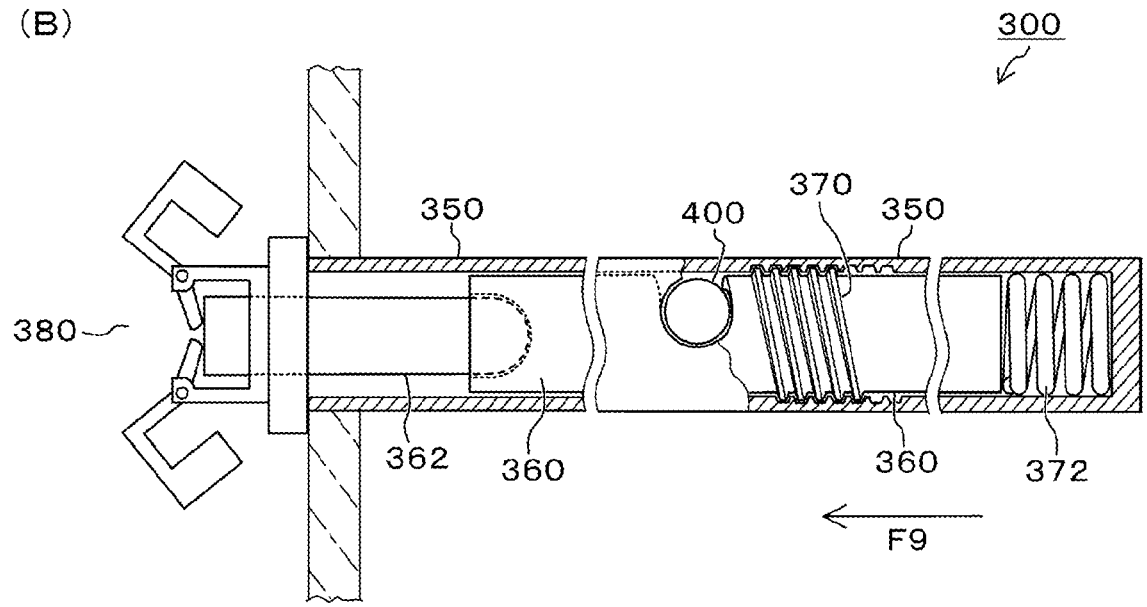

Fig.10
(A)
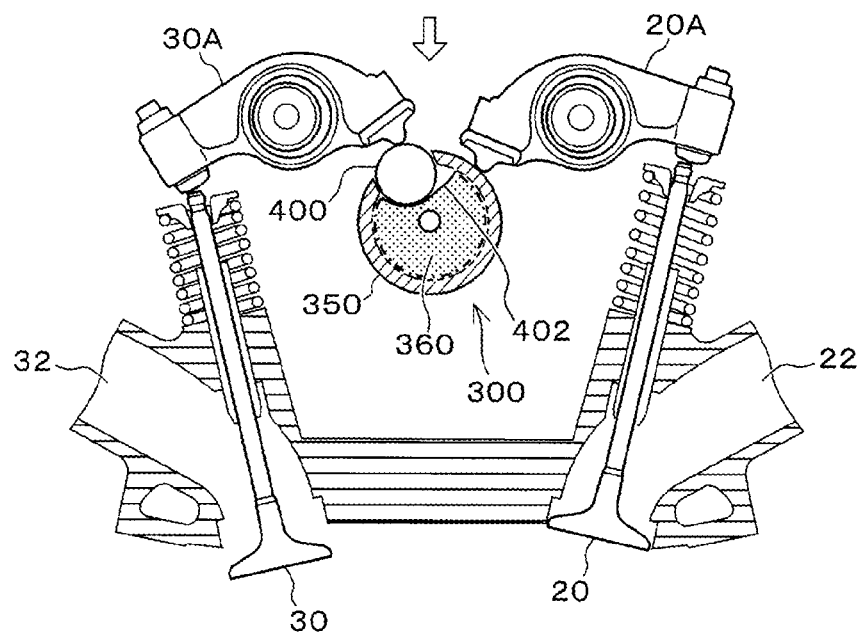
(B)
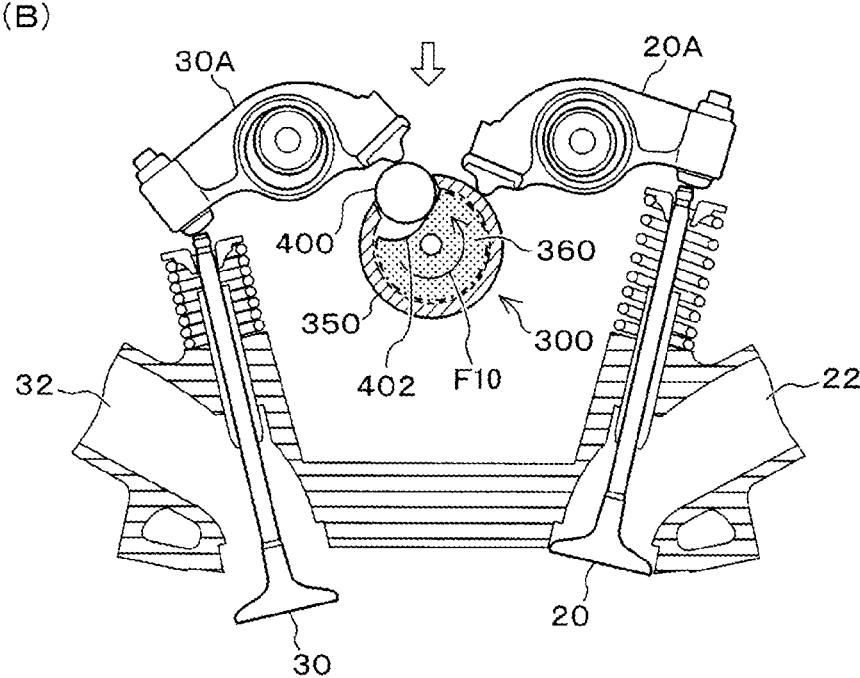

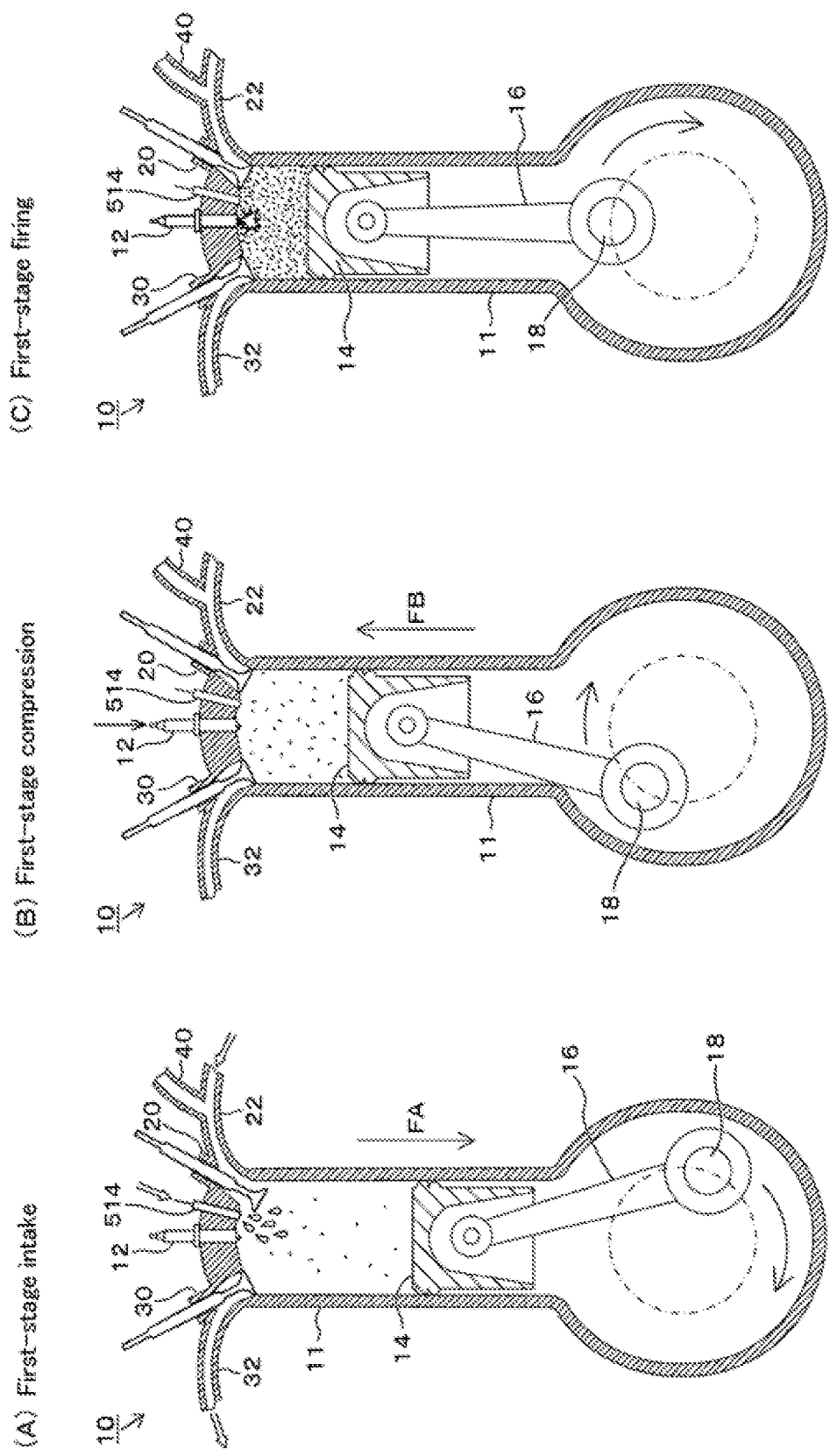

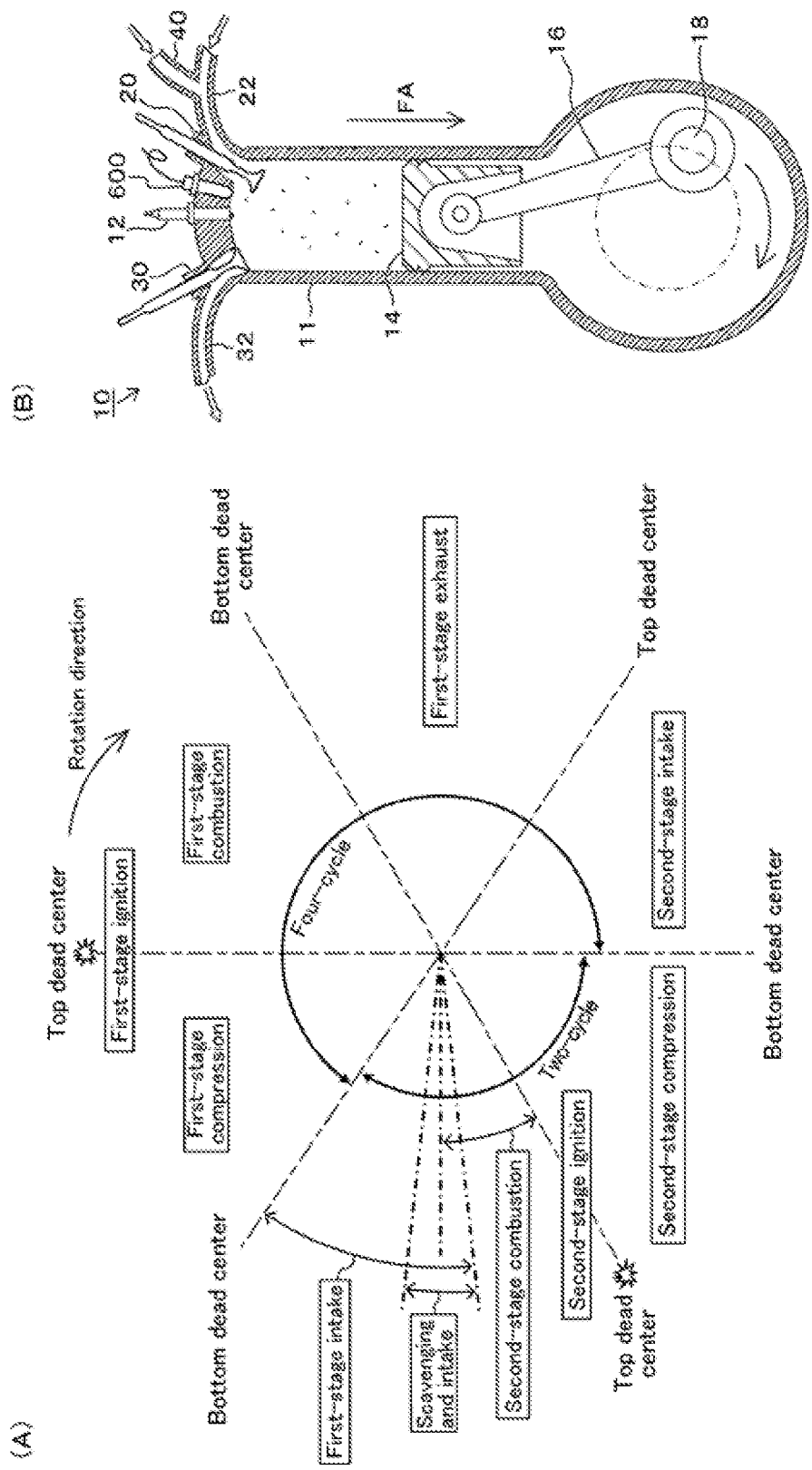

INTERNAL-COMBUSTION ENGINE AND DRIVE SYSTEM

CROSS-REFERENCE TO RELATED APPLICATIONS

This application is the U.S. National Phase under 35 U.S.C. § 371 of International Application PCT/JP2018/017279, filed Apr. 27, 2018, which claims priority to Japanese Patent Application No. JP2017-090654, filed Apr. 28, 2017. The International Application was published under PCT Article 21(2) in a language other than English.

TECHNICAL FIELD

The present invention relates to an improvement in an internal-combustion engine and a drive system suitable for an automobile engine, etc.

BACKGROUND ART

As automobile engines, two-cycle and four-cycle internal-combustion engines are known. A two-cycle internal-combustion engine causes one explosion per one rotation of a crankshaft, and a four-cycle internal-combustion engine causes one explosion per two rotations. On the other hand, a six-stroke cycle engine in which a scavenging and intake stroke and a scavenging and exhaust stroke are added after the four-cycle strokes is also known, and this causes one explosion per three rotations of a crankshaft. Patent Document 1 listed below discloses a "six-cycle engine" configured to include an air intake stroke and a pressurization stroke to pressurize air taken into a combustion chamber through the air intake stroke in transition from an exhaust stroke to an intake stroke of the four-cycle strokes and so that the pressurized air thus obtained is supplied to another cylinder that is in the latter half of an intake stroke.

On the other hand, against the backdrop of the recent rise in fuel prices and measures against global warming, a hybrid type engine for which an internal-combustion engine and an electric motor are combined has attracted attention. In addition, as systems with low environmental load, electric vehicles, hydrogen automobiles, and fuel-cell-powered vehicles, etc., have been proposed. The applicant of the present application therefore proposed an internal-combustion engine and a drive system (refer to Patent Document 2 listed below) suitable for a hybrid system and capable of further improving fuel consumption and reducing environmental load such as suppressing global warming.

On the other hand, in order to reduce the impact of environmental loads by measures against exhaust gas, etc., measures for commercial vehicles such as trucks and buses are important. However, hybrid systems and electric systems that make use a lot of batteries cannot be directly applied to commercial vehicles. In this respect, as a present drive system, reduction in fuel consumption of a gasoline engine and a diesel engine is also important, and this is considered to be an effective measure also in the future in consideration of the future spread of biofuels, etc.

CITATION LIST

Patent Documents

Patent Document 1: Japanese Unexamined Patent Application Publication No. H02-119635

Patent Document 2: Japanese Unexamined Patent Application Publication No. 2010-31705

SUMMARY OF INVENTION

As described above, in a conventional six-cycle internal-combustion engine, six-cycle strokes are set by adding an intake stroke and an exhaust stroke after four-cycle strokes, however, a pumping loss that occurs in these two-cycle strokes (intake and exhaust loss: an energy loss that occurs in the intake stroke and the exhaust stroke) causes engine output deterioration, and serves as a major cause of the six-cycle internal-combustion engines being inferior to four-cycle internal-combustion engines.

The present invention was made in view of the circumstances described above, and an object thereof is to reduce pumping loss in a six-cycle internal-combustion engine such as a gasoline engine and a diesel engine and increase the output.

Solution to Problem

In order to achieve the above-described object, an internal-combustion engine of the present invention is an internal-combustion engine in which a valve is opened and closed when a piston reciprocates in a cylinder, wherein an intake stroke→a compression stroke→a combustion stroke→an exhaust stroke in a four-cycle internal-combustion engine are combined with an intake and compression stroke→a combustion and exhaust stroke in a two-cycle internal-combustion engine, and the combined strokes are repeatedly performed.

An internal-combustion engine according to another aspect of the present invention is an internal-combustion engine in which a valve is opened and closed when a piston reciprocates in a cylinder, including, as the valve, an exhaust valve and an intake valve, and performing, during three reciprocations of the piston:

a. a first-stage intake stroke in which intake is performed by opening the intake valve and moving down the piston;

b. a first-stage compression stroke in which compression is performed by moving up the piston in a state where the intake valve and exhaust valve are closed;

c. a first-stage ignition stroke in which first-stage ignition is performed when the piston reaches a top dead center or the vicinity of the top dead center;

d. a first-stage combustion stroke in which combustion is performed by the first-stage ignition, and the piston moves down;

e. a first-stage exhaust stroke in which exhaust is performed by opening the exhaust valve when the piston moves down;

f. a scavenging and intake stroke in which scavenging and intake is performed until the piston moves up again by opening the intake valve in a state where the exhaust valve is open and before the piston reaches a bottom dead center;

g. a second-stage compression stroke in which compression is performed by closing both of the exhaust valve and the intake valve and moving up the piston;

h. a second-stage ignition stroke in which ignition is performed when the piston reaches the top dead center or the vicinity of the top dead center;

i. a second-stage combustion stroke in which combustion is performed by the second-stage ignition and the piston moves down; and j. a second-stage exhaust stroke in which exhaust is performed by opening the exhaust valve when the piston moves down.

According to a major mode, fuel to be ignited in the first-stage ignition stroke and fuel to be ignited in the second-stage ignition stroke are different from each other, and for example, the fuel to be ignited in the first-stage ignition stroke is diesel fuel, and the fuel to be ignited in the second-stage ignition stroke is gasoline fuel. According to another major mode, the internal-combustion engine includes a valve opening/closing mechanism that makes opening degrees of the exhaust valve and the intake valve larger at the time of high-speed rotation than at the time of low-speed rotation. According to another mode, as a cam that opens and closes the exhaust valve and the intake valve, a ball cam whose protrusion amount changes according to rotation of a camshaft is used. For example, the camshaft that opens and closes the exhaust valve and the intake valve is formed to have a double structure consisting of an inner and an outer, and is structured so that the inner rotates and slides with respect to the outer according to a speed, a ball cam is housed in a groove provided in the inner, and at the time of high-speed rotation, a protrusion amount of the ball cam from the outer increases and the camshaft slides in an advance direction. Further, as still another mode, a multi-cylinder configuration in which a plurality of the cylinders are provided is employed.

A drive system according to the present invention is a drive system using either of the internal-combustion engines described above, wherein an external supercharger and an EGR device are provided between the exhaust valve and the intake valve, and at the time of low-speed rotation, exhaust gas exhausted from the exhaust valve is cooled by the EGR device and supplied to the intake valve, and at the time of high-speed rotation, exhaust gas from an exhaust-side turbine housing of the external supercharger is cooled by the EGR device and supplied to the intake valve. Another drive system employs a hybrid type by using either of the internal-combustion engines described above and an electric motor in combination. The above-described and other objects, features, and advantages of the present invention will become clear from the following detailed description and accompanying drawings.

Advantageous Effects of Invention

According to the present invention, an intake stroke→a compression stroke→a combustion stroke→an exhaust stroke in a four-cycle internal-combustion engine are combined with an intake and compression stroke→a combustion and exhaust stroke in a two-cycle internal-combustion engine, so that the pumping loss is reduced, the output is increased, and thermal efficiency is improved, and this is suitable for an internal-combustion engine such as a gasoline engine of an automobile.

BRIEF DESCRIPTION OF DRAWINGS

FIG. 3 are views showing major strokes of the Example 1.

FIG. 9 are views showing a sectional structure of the valve opening/closing mechanism.

FIG. 10 are views showing states of valve opening and closing by the valve opening/closing mechanism.

FIG. 12 are views showing major strokes of the Example 4.

FIG. 13 are views showing Example 5 of the present invention.

DESCRIPTION OF EMBODIMENTS

Figure 1:
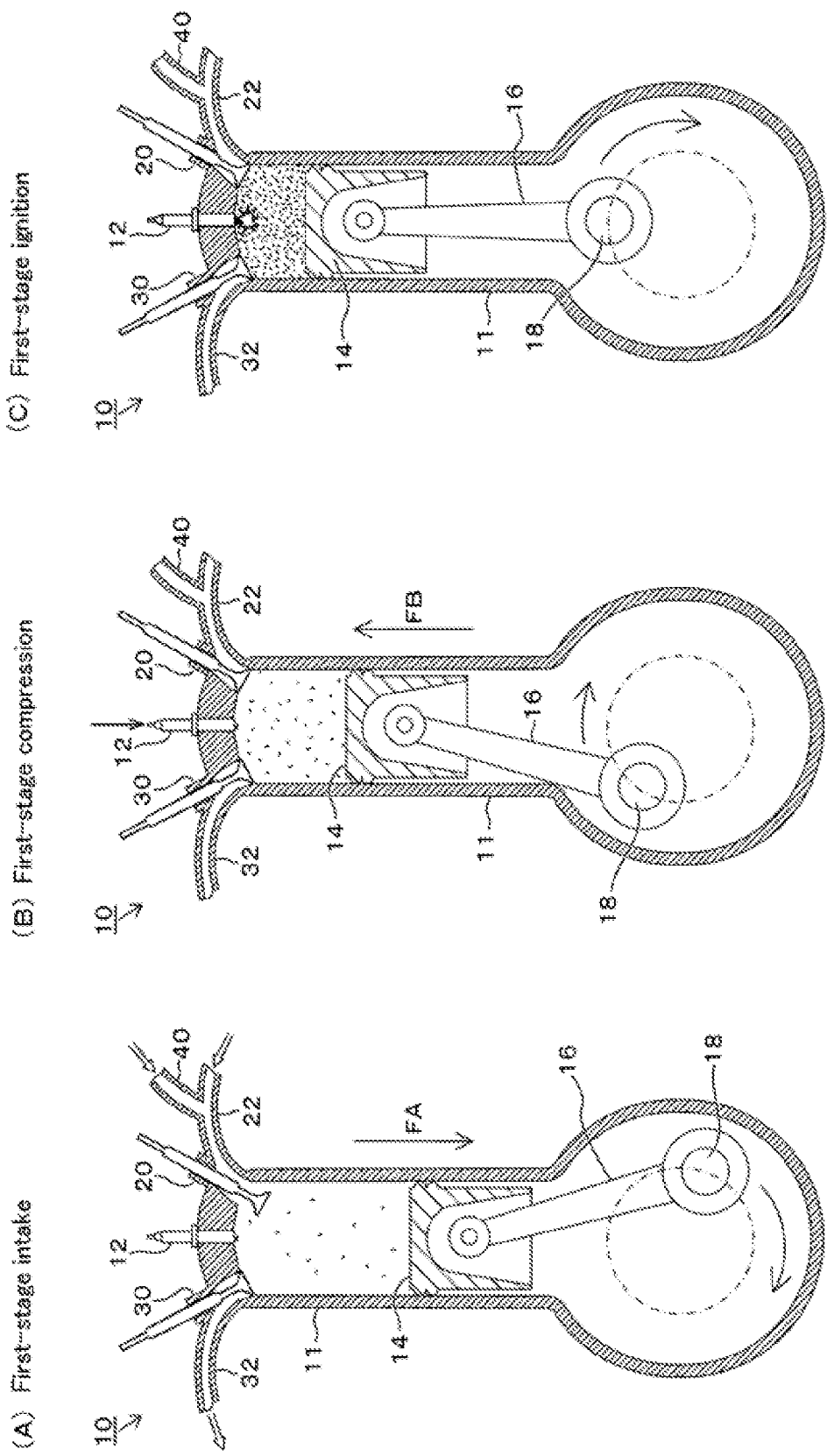
FIG. 1 are views showing a structure and major strokes of an engine of Example 1 of the present invention.
Figure 2:
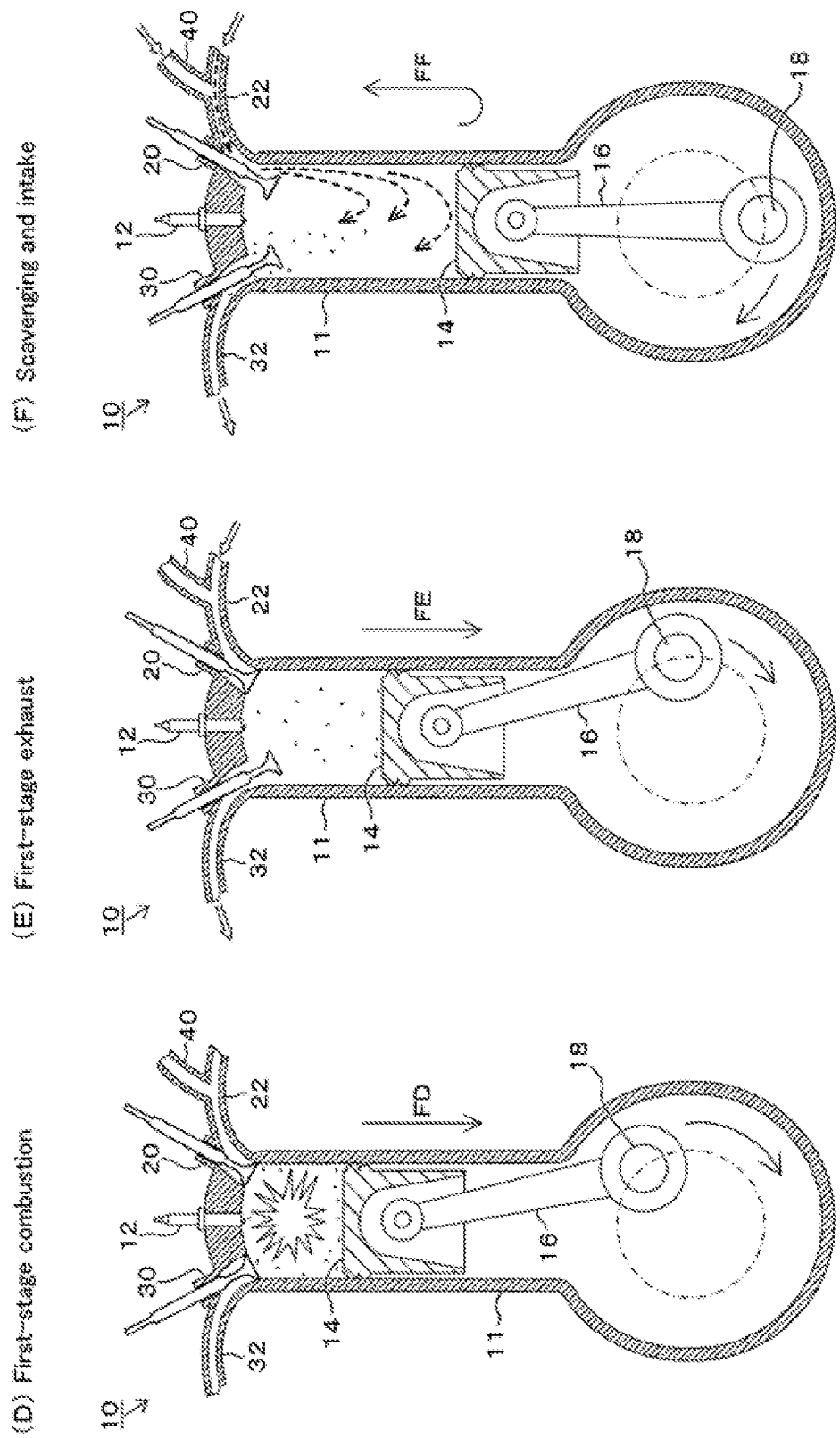
FIG. 2 are views showing major strokes of the Example 1.
Figure 4:
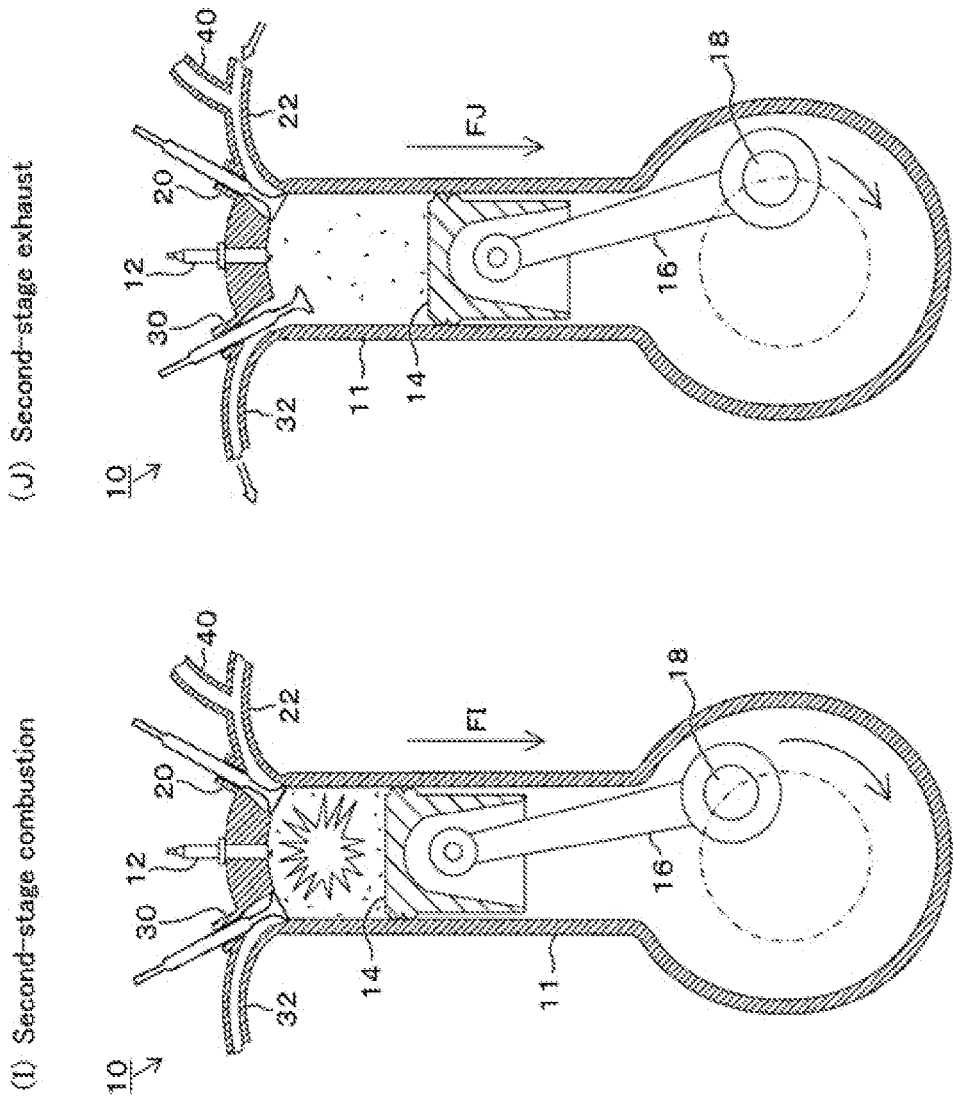
FIG. 4 are views showing major strokes of the Example 1.

Hereinafter, an embodiment of the present invention is described in detail based on Examples. In the following description, the term "ignition" is used when fuel is gasoline, and the term "firing" is used when fuel is diesel fuel, however, when there is no need to distinguish these, "firing" is included in "ignition."

Example 1

First, with reference to FIG. 1 to FIG. 6, Example 1 of six-cycle operation strokes of the present invention is described. As shown in FIG. 1(A), in a six-cycle engine 10 of the present example, for a cylinder 11, an ignition plug 12 and two valves 20 and 30 are provided, respectively. Of the valves 20 and 30, the intake valve 20 is a valve that opens when taking outside air into the cylinder 11, and compressed air by an external supercharger and recirculated exhaust gas by an EGR device are also suctioned into the cylinder 11 (refer to Example 2 described later). The exhaust valve 30 on the other hand is a valve that opens when gas after combustion is exhausted from the cylinder 11. To the intake valve 20, an intake port 22 for introducing outside air and a fuel port 40 for introducing fuel are connected, and to the exhaust valve 30, an exhaust port 32 for exhausting residual gas after combustion is connected. A piston 14 inside the cylinder 11 is joined to a crankshaft 18 via a connecting rod 16 in the same manner as the publicly known technology.

Figure 5:
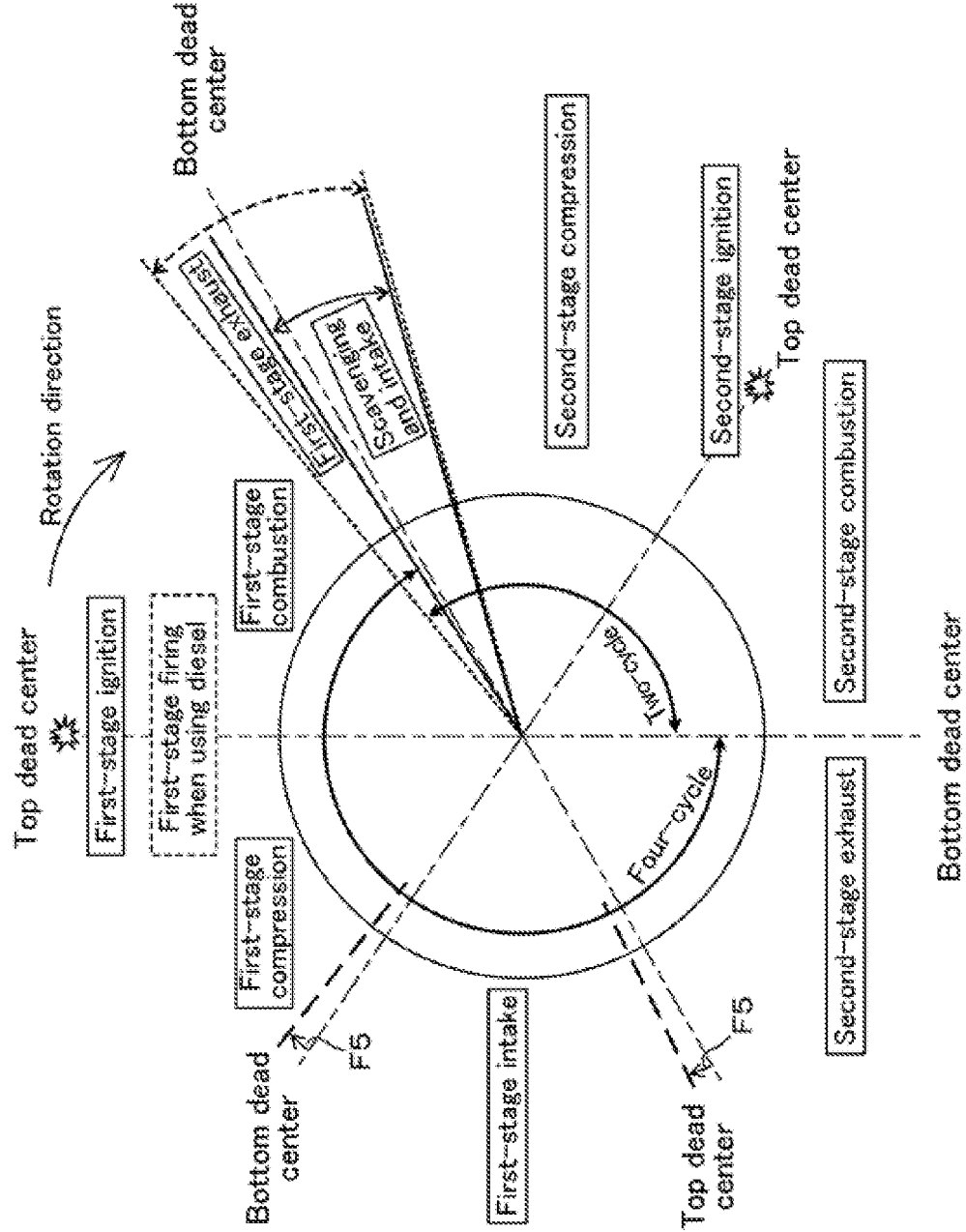
FIG. 5 is a diagram showing major strokes of the Example 1 corresponding to rotation of a crankshaft.
Figure 6:
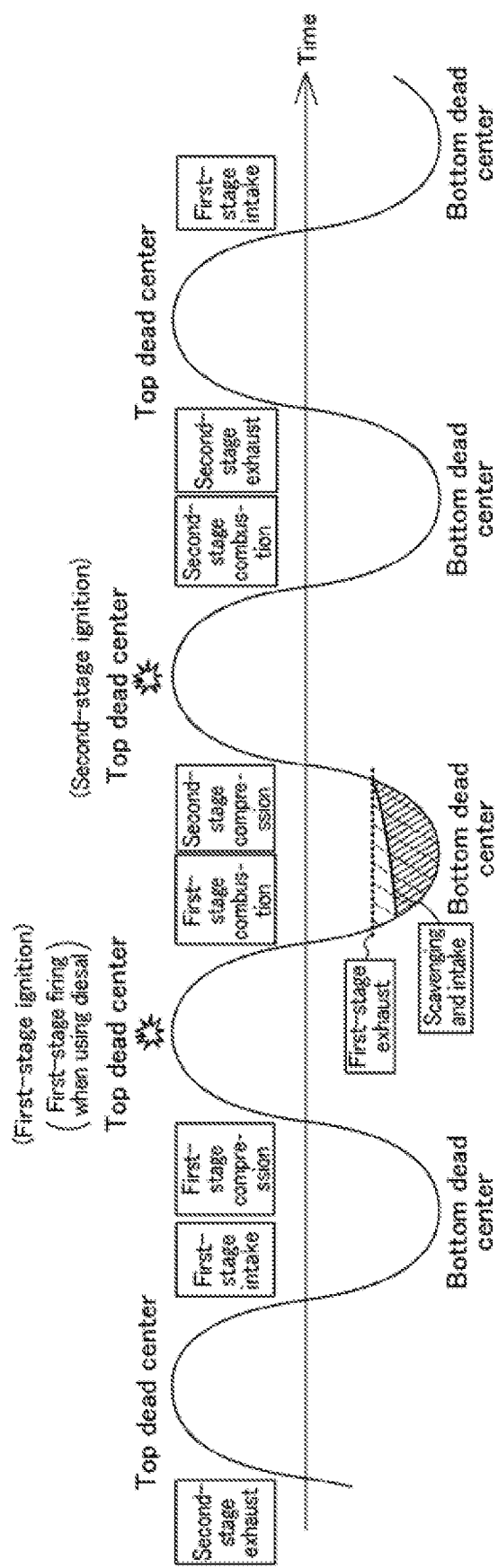
FIG. 6 is a diagram showing major strokes of the Example 1 corresponding to up-down motion of a piston.

Opening and closing of the valves 20 and 30 and movements of the piston 14 in the major strokes of the six-cycle operation in the present example are as shown in FIG. 1(A) to FIG. 4(J). The major strokes corresponding to three rotations of the crankshaft 18 are as shown in FIG. 5. Further, the major strokes corresponding to up-down motion in three reciprocations of the piston 14 are as shown in FIG. 6 (in FIG. 5 and FIG. 6, "first-stage firing" will be described later). As shown in these drawings, in the present example, fuel ignition is performed two times (first-stage ignition and second-stage ignition) during three rotations, and two-stage strokes: first-stage strokes of intake→compression→combustion→exhaust, and second-stage strokes of exhaust/scavenging/intake→compression→combustion→exhaust, are included. In addition, although operation is performed for six-cycle strokes as a whole, operation includes four-cycle strokes and two-cycle strokes. The strokes are not completely separate from each other, but partially overlap.

Hereinafter, with reference to these drawings, operation in the present example is described.

(1) First-stage intake stroke in FIG. 1(A): By opening the intake valve 20 and moving down the piston 14 (arrow FA), air intake is performed from the intake port 22. At this time, fuel is introduced from the fuel port 40, and an air-fuel mixture is introduced into the cylinder 11.

(2) First-stage compression stroke in FIG. 1(B): In a state where the intake valve 20 and the exhaust valve 30 are closed, the piston 14 is moved up (arrow FB), and the air-fuel mixture inside the cylinder 11 is compressed.

(3) First-stage ignition stroke in FIG. 1(C): When the piston 14 reaches a top dead center (or the vicinity of the top dead center), first-stage ignition is performed by the ignition plug 12.

(4) First-stage combustion stroke in FIG. 2(D): The air-fuel mixture is combusted by the ignition, and the piston 14 moves down (arrow FD).

(5) First-stage exhaust stroke in FIG. 2(E): By opening the exhaust valve 30 when the piston 14 moves down (arrow FE), exhaust gas after combustion is exhausted from the exhaust port 32.

(6) Scavenging and intake stroke in FIG. 2(F): Before the piston 14 reaches a bottom dead center, the intake valve is opened. Accordingly, air is introduced into the cylinder 11 from the intake valve 20, the piston 14 moves up again (arrow FF), and accordingly, scavenging by air is performed. At this time, fuel is also introduced from the fuel port 40 together with air.

(7) Second-stage compression stroke in FIG. 3(G): Both of the valves 20 and 30 are closed, and the piston 14 further moves up (arrow FG) and compresses the air-fuel mixture.

(8) Second-stage ignition stroke in FIG. 3(H): When the piston 14 reaches the top dead center (or the vicinity of the top dead center), second-stage ignition is performed by the ignition plug 12.

(9) Second-stage combustion stroke in FIG. 4(I): The air-fuel mixture is combusted by the ignition, and the piston 14 moves down (arrow FI).

(10) Second-stage exhaust stroke in FIG. 4(J): By opening the exhaust valve 30 when the piston 14 moves down (arrow FJ), exhaust gas after combustion is exhausted from the exhaust port 32.

As described above, the present example brings about the following effects.

a. A four-cycle operation and a two-cycle operation are combined, and intake (scavenging and intake)→compression (second-stage compression)→combustion (second-stage combustion)→exhaust (second-stage exhaust) of the two-cycle operation are performed instead of the strokes from air intake to air exhaust in a general six-cycle operation consisting of intake (first-stage intake)→compression (first-stage compression)→combustion (first-stage combustion)→exhaust (first-stage exhaust)→air intake→air exhaust. Therefore, a pumping loss that occurs in the air intake stroke and the air exhaust stroke in the six-cycle operation is reduced.

b. Combustion is performed at a rate of two times at the first and second stages per three rotations of the crankshaft 18. Therefore, the output is improved to two times or higher than that in the case of a six-cycle operation in which combustion is performed once per three rotations of the crankshaft. The output is improved to 1.3 times higher than that in the case of a four-cycle operation in which combustion is performed at a rate of once per two rotations of the crankshaft. In this way, according to the present example, the output can be increased and thermal efficiency can be improved.

c. As shown in FIG. 2(F), before entering second-stage ignition and combustion, scavenging and intake is performed and after the piston 14 reaches the bottom dead center, so that the degree of compression in FIG. 3(G) becomes low, and therefore, the fuel can be lean, so that gas after combustion is completely exhausted in the exhaust stroke in FIG. 4(J).

d. As shown in FIG. 2(F), before entering second-stage compression/ignition/combustion, scavenging and intake is performed in a range from before to after the bottom dead center of the piston 14, so that an exhaust time becomes long, and the pressure inside the cylinder 11 decreases to enable reducing friction (friction loss) of the piston 14.

e. By causing lean combustion by second-stage ignition in the second cycle, a machine loss is converted into lean burn combustion energy, so that the rotation of the crankshaft 18 can be kept low, and fuel consumption can also be improved.

f. The rate of combustion frequency to rotations of the crankshaft 18 is high, so that starting of the engine becomes excellent.

Example 2

Figure 7:
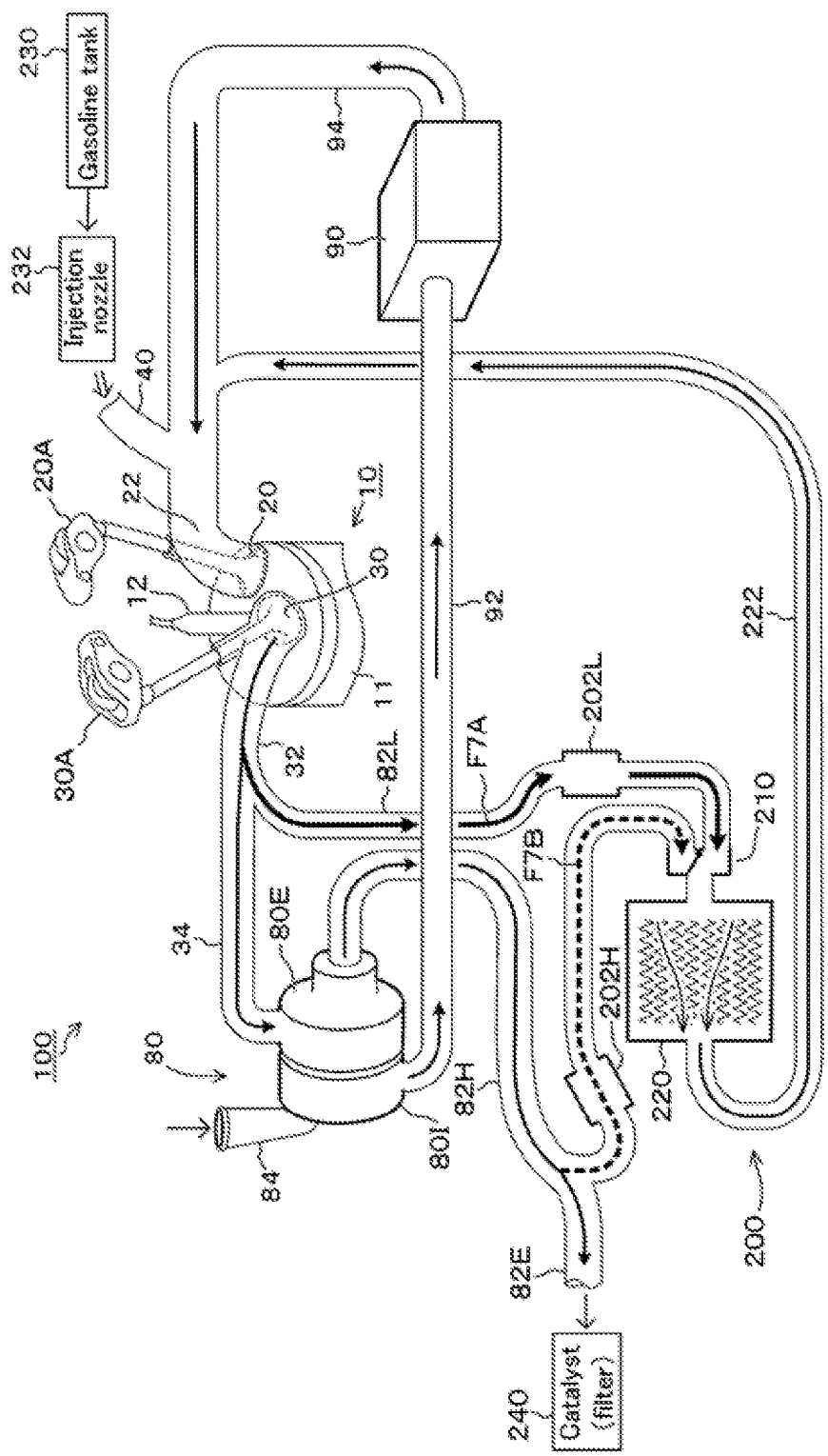
FIG. 7 is a view showing a configuration of Example 2 of the present invention.

Next, with reference to FIG. 7, Example 2 of the present invention is described. This example is an example of an engine system 100 constructed by providing an external supercharger and an EGR (Exhaust Gas Recirculation) device on the engine of Example 1 described above. As described above, the cylinder 11 of the six-cycle engine 10 is provided with two valves 20 and 30, and between the valves 20 and 30, an external supercharger (turbo-charger) 80 and an intercooler 90 are provided. In addition, an EGR device 200 is also provided, in which recirculated exhaust gases obtained from an exhaust side and an intake side of the external supercharger 80 described above are switched by a switching valve 210 and supplied to the intake valve 20 through an EGR cooler 220.

Next, as deleted description of the respective components, rocker arms 20A and 30A are provided on the valves 20 and 30, and are in contact with a cam of a camshaft. By rotation of this cam, opening and closing operations of the valves 20 and 30 shown in FIG. 1 to FIG. 4 are performed. An exhaust port 32 at the exhaust valve 30 side is connected to an exhaust-side turbine housing 80E of the external supercharger 80 through a duct line 34. An exhaust side of the exhaust-side turbine housing 80E is connected to a high-speed-side EGR duct line 82H, and this high-speed-side EGR duct line 82H is connected to an exhaust duct line 82E. At another side, the exhaust port 32 is also connected to a low-speed-side EGR duct line 82L, and the EGR duct lines 82L and 82H are respectively connected to switching sides of the switching valve 210. Accordingly, the EGR duct line 82L is selected at the time of low-speed rotation, and the EGR duct line 82H is selected at the time of high-speed rotation, and the selected EGR duct is connected to the EGR cooler 220. A recirculated exhaust gas discharge side of the EGR cooler 220 is connected to the intake port 22 of the intake valve 20 through a duct line 222. The EGR duct lines 82L and 82H are respectively provided with one-way valves (check valves) 202L and 202H to prevent backflow of exhaust gas. To a fuel port 40, gasoline as fuel is supplied from a gasoline tank 230 through an injection nozzle 232. To the exhaust duct line 82E, a catalyst (filter) 240 for gas purification is attached as necessary.

On the other hand, an intake-side turbine housing 801 of the above-described external supercharger 80 is provided with an air inlet 84, a discharge side of the intake-side turbine housing 801 is connected to a duct line 92, the intercooler 90, and a duct line 94 in this order, and further connected to the intake port 22. That is, outside air taken in from the air inlet 84 of the external supercharger 80 is compressed by the external supercharger 80, cooled by the intercooler 90, and then introduced into the cylinder 11 from the intake valve 20 together with recirculated exhaust gas recirculated by the EGR device 90.

Next, as description of the operation in the present example, at the time of low-speed rotation, the low-speed-side EGR duct line 82L is selected by the switching valve 210. Therefore, as shown by the arrow F7A (thick line), exhaust gas exhausted from the exhaust port 32 is introduced into and cooled by the EGR cooler 220, and supplied to the intake port 22 through the duct line 222. To the intake port 22, air discharged from the intake-side turbine housing 801 of the external supercharger 80 is supplied from the duct line 94 after passing through the duct line 92 and being cooled by the intercooler 90. To the intake port 22, the exhaust gas and compressed air that are mixed are supplied.

On the other hand, at the time of high-speed rotation, the high-speed-side EGR duct line 82H is selected by the switching valve 410. Therefore, as shown by the arrow F7B (dotted line), exhaust gas output from the exhaust-side turbine housing 80E of the external supercharger 80 is introduced into and cooled by the EGR cooler 220, and supplied to the intake port 22 through the duct line 222. To the intake port 22, air discharged from the intake-side turbine housing 801 of the external supercharger 80 is supplied from the duct line 94 after passing through the duct line 92 and being cooled by the intercooler 90.

In this way, according to the present example, at the time of low-speed rotation, exhaust gas is recirculated, and at the time of high-speed rotation, compressed exhaust gas is recirculated, so that purification of exhaust gas including NOx reduction can be realized. In particular, application of this system to the six-cycle engine 10 of Example 1 is effective for purification of residual exhaust gas generated in the two-cycle strokes from scavenging and intake to second-stage exhaust.

Example 3

Figure 8:
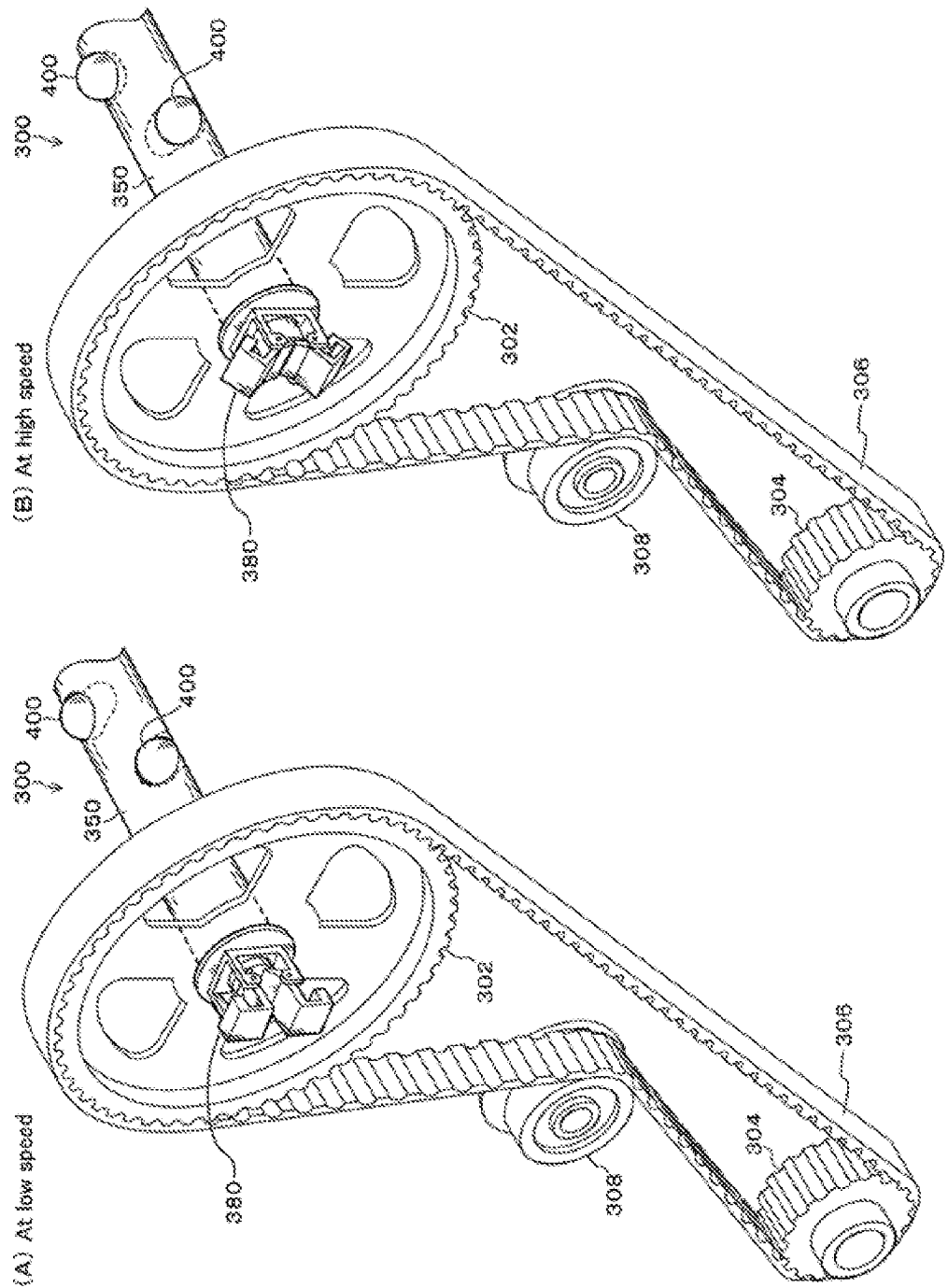
FIG. 8 are views showing a valve opening/closing mechanism of Example 3 of the present invention.

Next, with reference to FIG. 8 to FIG. 10, Example 3 of the present invention is described. To open and close the above-described valves 20 and 30 in accordance with the respective strokes shown in FIG. 1 to FIG. 4, the cam of the rocker arm is formed into a shape corresponding to opening and closing, and in this example, the shape of the cam is devised.

FIG. 8 show an example of a valve opening/closing mechanism suitable for the six-cycle engine of Example 1 described above. FIG. 9 are essential portion sectional views of the camshaft, and FIG. 10 show a relationship between the camshaft and opening and closing of the valves 20 and 30. (A) of each of these drawings shows a state at the time of low-speed rotation, and (B) of each of these drawings shows a state at the time of high-speed rotation.

In these drawings, the camshaft 300 is provided with a cam pulley 302, and a rotational drive force of a crankshaft timing gear 304 is transmitted through a timing belt 306. Reference sign 308 denotes a tension idler arranged to adjust a tension of the timing belt 306. The crankshaft timing gear 304 is provided on the above-described crankshaft 18.

Next, the camshaft 300 of the present example has a double structure consisting of a shaft outer 350 and a shaft inner 360 inserted in the shaft outer 350 as shown in FIG. 9. The above-described cam pulley 302 is fixed to an outer circumference of the shaft outer 350. On a contact surface between the shaft outer 350 and the shaft inner 360, a helical screw 370 is provided, and at a bottom of the shaft outer 350 and the shaft inner 360, a pressing spring 372 is provided. At a side of the shaft inner 360 opposite to the portion in contact with the spring 372, a push rod 362 is provided, and on this push rod 362, a governor 380 is provided.

In the illustrated example, the governor 380 is a centrifugal type. Other than this, various publicly known structures such as an electromagnetic type, a hydraulic type may be employed. At the time of low-speed rotation, the governor 380 closes and pushes the push rod 362 against a biasing force of the spring 372, and the shaft inner 360 is pushed into the shaft outer 350. In contrast, at the time of high-speed rotation, the governor 380 is opened by a centrifugal force, and the push rod 362 and then the shaft inner 360 comes to be pushed against the spring 372. Therefore, the shaft inner 360 comes to slide in a direction toward the push rod 362 (refer to the arrow F9 in FIG. 9(B)) while rotating due to the helical screw 370 (refer to the arrow F10 in FIG. 10(B)).

On the other hand, in the camshaft 300, a required number of ball cams (rigid spheres) arranged to open the valves 20 and 30 are provided. The ball cam 400 is housed in a guide groove 402 provided in the shaft inner 360 so as not to escape but to protrude from the shaft outer 305. The guide groove 402 provided in the shaft inner 360 is formed along a helical direction of the above-described helical screw 370 so as to change in depth as shown FIG. 10, and at the time of low-speed rotation, the ball cam 400 is at a deep position in the guide groove 402. When the time of high-speed rotation is entered, as described above, the shaft inner 360 slides while rotating due to the helical screw 370, so that the ball cam 40 moves to a shallow position in the guide groove 402 and protrudes. In addition, the entirety of the camshaft 300 slides in the rotation direction, that is, an advance direction in which the angle is advanced in FIG. 5.

The camshaft 300 including such ball cams 400 is disposed as shown in FIG. 10, the rocker arms 20A and 30A are biased by the ball cams 400 to push the valves 20 and 30, and accordingly, opening and closing operations shown in FIG. 1 to FIG. 4 are performed. FIG. 10 show one representative ball cam 400.

Next, operation of the present example is described. First, at the time of low-speed rotation, as shown in FIG. 8(A) to FIG. 10(A), there is a state in which the governor 380 is closed and the shaft inner 360 is pushed into the shaft outer 350. Therefore, the protrusion amount of the ball cam 400 is small. In contrast, at the time of high-speed rotation, the shaft inner 360 rotates to slide, and the ball cam 400 increases its protrusion amount and moves in the advance direction in its entirety. Therefore, a. Due to the increase in protrusion amount, the degree of pushing the rocker arm 20A, 30A increases, and the valve 20, 30 opens wide. That is, a valve lift amount for intake, exhaust, and scavenging increases. Therefore, intake, exhaust, and scavenging are more smoothly performed.

b. The ball cam 400 moves in the advance direction, so that as shown by the arrow F5 in FIG. 5, overlap occurs between strokes of intake, compression, etc. Therefore, an output during high-speed rotation is improved.

Further, according to the present example, by properly adjusting the protrusion amount and the advance of the ball cams 400, adaptation to gasoline, diesel fuel, shale gas, and natural gas at low cost is possible, and moreover, the ball cams 400 come into point contact with the rocker arms 20A and 30A, so that an advantage of a small friction loss can also be obtained. In particular, applying this valve opening/closing mechanism to the six-cycle engine of Example 1 enables responding satisfactorily to changing the cam size between four-cycle strokes and two-cycle strokes. In the four-cycle strokes shown in FIG. 5, the angles of opening of the valves 20 and 30 are approximately 60°, whereas in the two-cycle strokes, the angle is approximately 25° before the piston reaches the bottom dead center for first-stage exhaust, and is approximately 20° before the piston reaches the bottom dead center for scavenging and intake. Realization of this by using a general cam results in a protruding cam shape, and is not realistic. However, by applying the ball cam structure of the present example, the angle of opening of the valve 20, 30 can be adjusted by changing the protrusion amount by changing the diameter of the ball cam 400, and this is advantageous.

Example 4

Figure 11:
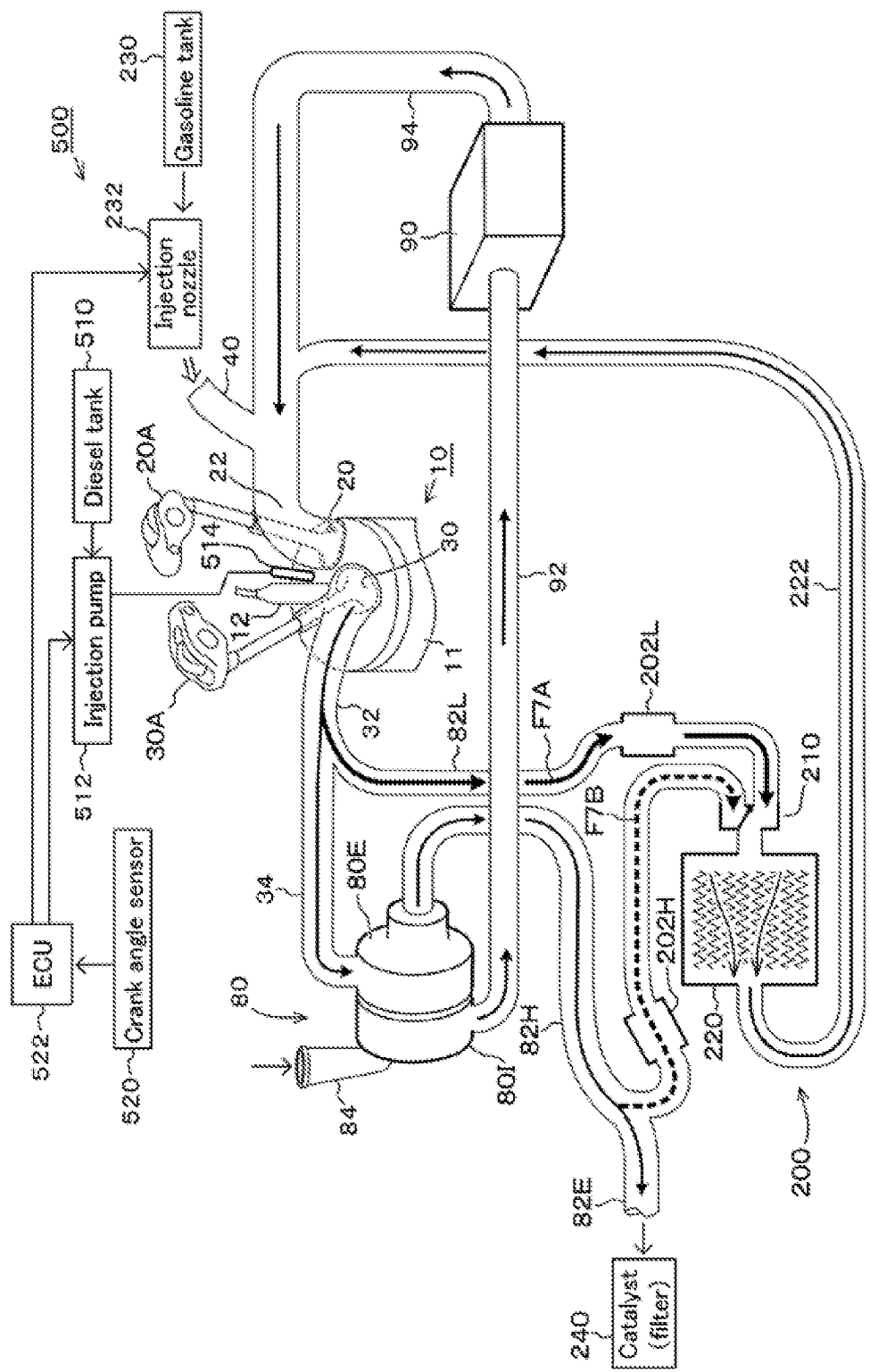
FIG. 11 is a view showing a configuration of Example 4 of the present invention.

Next, with additional reference to FIG. 11 and FIG. 12, Example 4 of the present invention is described. In the examples described above, in each first-stage stroke and each second-stage stroke, one kind of fuel such as only gasoline or only diesel fuel is used, however, in an engine system 500 of the present example, two kinds of fuel are used, and for example, in the four-cycle strokes of the first stage, diesel fuel is burned, and in the two-cycle strokes of the second stage, gasoline is burned. In FIG. 11, in the cylinder 11, in addition to the ignition plug 12 and the two valves 20 and 30 described above, a fuel nozzle 514 is provided, and diesel fuel (light oil) is supplied from a diesel tank 510 through an injection pump 512.

Operations of an injection nozzle 232 at the gasoline fuel side and the injection pump 512 at the diesel fuel side are controlled by an ECU (Engine Control Unit) based on a crank angle detected by a crank angle sensor 520. That is, as shown in FIG. 5 and FIG. 6, in the first stage, diesel fuel is supplied from the injection pump 512 and first-stage firing is performed, and in the second stage, in the same manner as in the examples described above, gasoline fuel is supplied from the injection nozzle 232 and second-stage ignition is performed. FIG. 12 show the first-stage strokes, and in the first-stage intake stroke shown in FIG. 12(A), diesel fuel is supplied from the fuel nozzle 514 into the cylinder 11. Then, after first-stage compression in FIG. 12(B), the first-stage firing stroke shown in FIG. 12(C) is entered. Other strokes are the same as in the examples described above.

In this way, according to the present example, diesel fuel is used in the first stage and gasoline fuel is used in the second stage, and this brings about the following effects.

a. By using diesel fuel, thermal efficiency is improved, the output is increased, and fuel consumption is lowered as compared with the case using gasoline fuel.

b. Exhaust gas generated in combustion of diesel fuel in the first stage is re-burned by combustion of gasoline fuel in the second stage by the EGR device 200 (cetane and octane reburning). By this reburning, NOx (nitrogen oxide) and HC (hydrocarbon) in exhaust gas from the first stage are reduced. Removal of them by the catalyst 240 is also performed. Therefore, as compared with the case using only diesel fuel, exhaust gas can be purified.

Example 5

Next, with reference to FIG. 13, Example 5 of the present invention is described. The present example discloses another combination of four-cycle strokes and two-cycle strokes. As shown in FIG. 13(A), as compared with the example shown in FIG. 5 described above, the timing of second-stage ignition is a timing retarded by 120 degrees. That is, next to a first-stage exhaust stroke of the four-cycle operation, second-stage intake→second-stage compression-→second-stage ignition→second-stage combustion→scavenging and intake→first-stage intake are performed. The four-cycle and the two-cycle indicated in the drawings are indicated for convenience when focusing on the ignition timing at the top dead center. When sufficient intake cannot be performed in the first-stage intake stroke, and ignition and combustion in the four-cycle strokes are insufficient, air can be supplied into the cylinder from an air nozzle 600 shown in FIG. 13(B).

Comparing this example in FIG. 13(A) with the example in FIG. 5 described above, in the example in FIG. 5, exhaust and intake after the second-stage ignition can be sufficiently performed, whereas in the example in FIG. 13(A), scavenging and intake after the second-stage ignition are not sufficient, and the example in FIG. 5 is superior in terms of power. In terms of the reduction in pumping loss, the example in FIG. 5 is superior. Therefore, as a whole, the example in FIG. 5 is more preferable than the example in FIG. 13(A). Use of the air nozzle 600 shown in FIG. 13(B) to solve the problem in the example in FIG. 13(A) leads to a complicated system and an increase in cost.

The present invention is not limited to the examples described above, and can be variously modified without departing from the spirit of the present invention. For example, the present invention includes the followings as well.

(1) In the examples described above, a case using single cylinder (1 cylinder) is mainly described, however, of course, this does not preclude employment of a publicly known multi-cylinder configuration for smooth rotation of the crankshaft.

(2) The piston mechanism and the valve opening/closing mechanism shown in the examples described above are just examples, and can be changed in design by applying publicly known technologies so as to bring about the same operation and effects. For fuel introduction as well, other than supplying from the fuel port 40, various publicly known methods such as a direct injection method can be employed.

(3) The present invention is suitable mainly for a gasoline engine, and is also applicable to various fuels such as diesel fuel, LP gas (natural gas), ethanol, hydrogen, shale gas. Without limiting to general passenger vehicles, the present invention is also applicable to various purposes such as trucks, buses, ships, and electrical generators, etc. Further, application to a hybrid type internal-combustion engine is not precluded.

(4) A case using gasoline as fuel in the first stage and the second stage is shown in the examples described above, however, diesel fuel and LP gas may also be used. That is, in first stage/second stage, a. gasoline/gasoline b. diesel fuel/diesel fuel c. LP gas/LP gas can be considered. In the example in which different fuels are used in the first stage and the second stage, diesel fuel was used in the first stage, and gasoline fuel was used in the second stage, however, various fuel combinations in the first stage and the second stage can be considered. For example, for first stage/second stage, the following combinations:

a. diesel fuel/gasoline
b. diesel fuel/LP gas
c. LP gas/gasoline can also be employed.

INDUSTRIAL APPLICABILITY

According to the present invention, an intake stroke→a compression stroke→a combustion stroke→an exhaust stroke in a four-cycle internal-combustion engine are combined with an intake and compression stroke→a combustion and exhaust stroke in a two-cycle internal-combustion engine, so that the pumping loss is reduced, the output is increased, and thermal efficiency is improved, and this is suitable for an internal-combustion engine such as a gasoline engine of an automobile.

REFERENCE SIGNS LIST

10: Six-cycle engine
11: Cylinder
12: Ignition plug
14: Piston
16: Connecting rod
18: Crankshaft
20: Intake valve
20A, 30A: Rocker arm
22: Intake port
30: Exhaust valve
32: Exhaust port
34: Duct line
40: Fuel port
80: External supercharger
80E: Exhaust-side turbine housing
80I: Intake-side turbine housing
82E: Exhaust duct line
82L, 82H: Duct line
84: Air inlet
90: Intercooler
92, 94: Duct line
100: Engine system
200: EGR device
210: Switching valve
220: Cooler
222: Duct line
230: Gasoline tank
232: Injection nozzle
240: Catalyst (filter)
300: Camshaft
302: Cam pulley
304: Crankshaft timing gear
306: Timing belt
350: Shaft outer
360: Shaft inner
362: Push rod
370: Helical screw
372: Spring
380: Governor
400: Ball cam
402: Guide groove
500: Engine system
510: Diesel tank
512: Injection pump
514: Fuel nozzle
520: Crank angle sensor
522: ECU
600: Air nozzle

The invention claimed is:

1. An internal combustion engine comprising an intake port with an intake valve and an exhaust port with an exhaust valve, in which the intake valve alternately opens and closes the intake port, and the exhaust valve alternately opens and closes the exhaust port, when a piston reciprocates in a cylinder, wherein provided is a valve opening/closing mechanism made for controlling opening/closing of each of the intake valve and the exhaust valve in a manner repeatedly performing one cycle comprising the following:

(1) an intake stroke→(2) a compression stroke→(3) a combustion stroke→(4) an exhaust stroke in a four-cycle internal combustion engine cycle, which is combined with a two-cycle internal combustion engine cycle constituted by an intake and compression stroke formed by (i) a scavenging step and (ii) a compression step, and a combustion and exhaust stroke formed by (iii) a combustion step and (iv) an exhaust step, in the following sequence constituting one repeating cycle:

(1)→(2)→(3)→(iv)→(i)→(ii)→(iii)→(4)

wherein at step (iv), the valve opening/closing mechanism opens the exhaust valve before the piston reaches a bottom dead center while the intake valve is closed, and at step (i), the valve opening/closing mechanism opens the intake valve before the piston reaches the bottom dead center while the exhaust valve is open, wherein the combined cycle is repeatedly performed using the piston.

2. An internal combustion engine comprising an intake port with an intake valve and an exhaust port with an exhaust valve, in which the intake valve alternately opens and closes the intake port, and the exhaust valve alternately opens and closes the exhaust port, when a piston reciprocates in a cylinder, wherein provided is a valve opening/closing mechanism made for controlling opening/closing of each of the intake valve and the exhaust valve in a manner repeatedly performing the following as one repeating cycle in sequence, during three reciprocations of the piston:

a first-stage intake stroke in which intake is performed by opening the intake valve and moving down the piston;

a first-stage compression stroke in which compression is performed by moving up the piston in a state where the intake valve and exhaust valve are closed;

a first-stage ignition stroke in which first-stage ignition is performed when the piston reaches a top dead center or the vicinity of the top dead center;

a first-stage combustion stroke in which combustion is performed by the first-stage ignition, and the piston moves down;

a first-stage exhaust stroke in which exhaust is performed by opening the exhaust valve when the piston moves down;

a scavenging and intake stroke in which scavenging and intake is performed until the piston moves up again by opening the intake valve in a state where the exhaust valve is open and before the piston reaches a bottom dead center;

a second-stage compression stroke in which compression is performed by closing both of the exhaust valve and the intake valve and moving up the piston;

a second-stage ignition stroke in which ignition is performed when the piston reaches the top dead center or the vicinity of the top dead center;

a second-stage combustion stroke in which combustion is performed by the second-stage ignition and the piston moves down; and a second-stage exhaust stroke in which exhaust is performed by opening the exhaust valve when the piston moves down, wherein at the first-stage exhaust stroke and the second-stage exhaust stroke, the valve opening/closing mechanism opens the exhaust valve before the piston reaches a bottom dead center while the intake valve is closed, and at the scavenging and intake stroke, the valve opening/closing mechanism opens the intake valve before the piston reaches the bottom dead center while the exhaust valve is open, wherein the internal combustion engine repeatedly performs, using the piston, the foregoing operations in sequence as one repeating cycle corresponding to three reciprocations of the piston.

3. The internal combustion engine according to claim 2, wherein fuel to be ignited in the first-stage ignition stroke and fuel to be ignited in the second-stage ignition stroke are different from each other.

4. The internal combustion engine according to claim 3, wherein the fuel to be ignited in the first-stage ignition stroke is diesel fuel, and the fuel to be ignited in the second-stage ignition stroke is gasoline fuel.

5. The internal combustion engine according to claim 1, wherein the valve opening/closing mechanism makes opening degrees of the exhaust valve and the intake valve larger at the time of high-speed rotation than at the time of low-speed rotation.

6. The internal combustion engine according to claim 1, wherein as a cam that opens and closes the exhaust valve and the intake valve, a ball cam whose protrusion amount changes according to rotation of a camshaft is used.

7. The internal combustion engine according to claim 2, wherein as a cam that opens and closes the exhaust valve and the intake valve, a ball cam whose protrusion amount changes according to rotation of a camshaft is used.

8. The internal combustion engine according to claim 7, wherein
the camshaft that opens and closes the exhaust valve and the intake valve is formed to have a double structure consisting of an inner and an outer, and
is structured so that the inner rotates and slides with respect to the outer according to a speed,
a ball cam is housed in a groove provided in the inner, and
at the time of high-speed rotation, a protrusion amount of the ball cam from the outer increases, and the camshaft slides in an advance direction.

9. An internal combustion engine having a multi-cylinder configuration in which a plurality of the cylinders are provided, wherein each cylinder is equipped with the internal combustion engine of claim 1.

10. A drive system using the internal combustion engine according to claim 1, wherein
an external supercharger and an EGR device are provided between the exhaust valve and the intake valve, and
at the time of low-speed rotation, exhaust gas exhausted from the exhaust valve is cooled by the EGR device and supplied to the intake valve, and
at the time of high-speed rotation, exhaust gas from an exhaust-side turbine housing of the external supercharger is cooled by the EGR device and supplied to the intake valve.

11. A hybrid type drive system, using the internal combustion engine according to claim 1 and an electric motor in combination.

12. The internal combustion engine according to claim 2, wherein the valve opening/closing mechanism makes opening degrees of the exhaust valve and the intake valve larger at the time of high-speed rotation than at the time of low-speed rotation.

13. An internal combustion engine having a multi-cylinder configuration in which a plurality of the cylinders are provided, wherein each cylinder is equipped with the internal combustion engine of claim 2.

14. A drive system using the internal combustion engine according to claim 2, wherein
an external supercharger and an EGR device are provided between the exhaust valve and the intake valve, and
at the time of low-speed rotation, exhaust gas exhausted from the exhaust valve is cooled by the EGR device and supplied to the intake valve, and
at the time of high-speed rotation, exhaust gas from an exhaust-side turbine housing of the external supercharger is cooled by the EGR device and supplied to the intake valve.

15. A hybrid type drive system, using the internal combustion engine according to claim 2 and an electric motor in combination.

* * * * *